United States Patent
Wu (10) Patent No.: US 8,664,029 B2
(45) Date of Patent: Mar. 4, 2014

(54) PROCESS FOR FABRICATING A CAPACITANCE TYPE TRI-AXIAL ACCELEROMETER

(75) Inventor: Ming-Ching Wu, Taipei County (TW)

(73) Assignee: Domintech Co., Ltd., Taipei County (TW)

( * ) Notice: Subject to any disclaimer, the term of this patent is extended or adjusted under 35 U.S.C. 154(b) by 1171 days.

(21) Appl. No.: 12/581,358

(22) Filed: Oct. 19, 2009

(65) Prior Publication Data
US 2010/0242602 A1 Sep. 30, 2010

(30) Foreign Application Priority Data
Mar. 31, 2009 (TW) ................................ 98110752 A (51) Int. Cl.
*H01L 21/00* (2006.01)
(52) U.S. Cl.
USPC ............... 438/50; 438/51; 438/52; 438/53; 257/E21.19; 257/E21.2; 257/E21.421; 257/E21.499
(58) Field of Classification Search
USPC ............... 438/50, 51, 52, 53, 462; 73/514.32, 73/514.38; 257/E21.19, E21.2, E21.421, 257/E21.499
See application file for complete search history.

(56) References Cited

U.S. PATENT DOCUMENTS

| | | | |
|---|---|---|---|
| 6,159,761 A * | 12/2000 | Okada | 438/53 |
| 6,223,598 B1 * | 5/2001 | Judy | 73/514.32 |
| 6,705,167 B2 * | 3/2004 | Kvisteroey et al. | 73/514.38 |
| 6,845,670 B1 * | 1/2005 | McNeil et al. | 73/514.38 |
| 7,361,523 B2 | 4/2008 | Sooriakumar et al. | |

* cited by examiner

*Primary Examiner* — David Nhu
(74) *Attorney, Agent, or Firm* — Muncy, Geissler, Olds & Lowe, P.C.

(57) ABSTRACT

A process for fabricating a capacitance type tri-axial accelerometer comprises of preparing a wafer having an upper layer, an intermediate layer and a lower layer, etching the lower layer of the wafer to form an isolated proof mass having a core and four segments extending from the core, etching the upper layer of the wafer to form a suspension and four separating plates, etching away a portion of the intermediate layer located between the four segments of the proof mass and the plates of the upper layer, and disposing an electrical conducting means to pass through the intermediate layer from the suspension to the core of the proof mass.

14 Claims, 8 Drawing Sheets

PROCESS FOR FABRICATING A CAPACITANCE TYPE TRI-AXIAL ACCELEROMETER

BACKGROUND OF THE INVENTION

1. Field of the Invention

The invention relates to accelerometers, and more particularly, to a process for fabricating a capacitance type tri-axial accelerometer used in micro electro-mechanical systems (MEMS).

2. Description of the Related Art

Known in the art is a method of fabricating an accelerometer capable of detecting acceleration along three orthogonal axes as disclosed in U.S. Pat. No. 7,361,523. This method, as shown in its FIGS. 15 and 16, forms two in-plane accelerometers (the first and second accelerometers) positioned at right angles to each other so as to assess acceleration in two directions within the plane thereof, and a third accelerometer disposed out-of-plane to measure acceleration in a direction perpendicular to the plane where the first and second accelerometers are positioned.

Such a three-axis accelerometer made by the method mentioned above has several disadvantages. The first is that the location of the third accelerometer is different from that of the first and second accelerometers so that the size of the three-axis accelerometer as a whole is too large to be suitable for micro electro-mechanical systems. The second disadvantage is that the comb-like capacitive plates of the three-axis accelerometer are combined in a mechanical way such that the assess value of each of the accelerometers unavoidably affect each other. The result is that the measurement taken by the three-axis accelerometer is inaccurate. Furthermore, each set of the comb-like capacitive plates of the three-axis accelerometer is used not only as capacitive elements but also as a proof mass, thereby limiting the mass that can detect external accelerations and reducing sensitivity.

It is therefore a principal object of the present invention to provide a process for fabricating a capacitance type tri-axial accelerometer having a suitable size for use in micro electro-mechanical systems.

Another object of the present invention is to provide a process for fabricating a capacitance type tri-axial accelerometer having a higher sensitivity than prior art.

A further object of the present invention is to provide a process for fabricating a capacitance type tri-axial accelerometer which can precisely sense external accelerations.

SUMMARY OF THE INVENTION

Thus, the process of the present invention includes the steps of preparing a wafer having an upper layer, an intermediate layer and a lower layer, said upper and lower layers being made of semiconductor material and said intermediate layer being made of insulating material; etching said lower layer of said wafer to form an isolated proof mass having a core and four segments respectively extending from said core; etching said upper layer of said wafer to form a suspension and four separating plates, said suspension connecting with said core of said proof mass through said intermediate layer; etching away a portion of said intermediate layer located between said four segments of said proof mass and said plates of said upper layer such that said proof mass can freely swing up and down following said suspension; and preparing an electrical conducting means to pass through said intermediate layer from said suspension to said core of said proof mass such that said suspension and said proof mass are electrically connected.

Preferably each of said segments of said proof mass extends symmetrically and outwardly from said core.

Preferably each of said segments is separated from each other by a slot disposed between said segments.

Preferably said suspension has a center and four arms extending respectively, symmetrically and outwardly from said center.

Preferably each of said arms of said suspension has a width smaller than that of said slot.

Preferably said center of said suspension is connected with said core of said proof mass by a center portion of said intermediate layer located between said upper and lower layers.

Preferably each of said arms of said suspension has a first conducting pad disposed on an end thereof, and each of said plates of said upper layer has a second conducting pad disposed on an edge thereof.

Preferably said electrical conducting means is a conducting plug extending from said center of said suspension through said intermediate layer to said core of said proof mass.

Preferably said conducting plug is formed by the steps of etching said upper layer and said intermediate layer to form a straight hole extending from said center of said suspension through said intermediate layer to said core of said proof mass; depositing an electrical conducting material upon the upper surface of said upper layer in such a way that said straight hole is filled by said electrical conducting material; and removing all said electrical conducting material from the upper surface of said upper layer except the portion of said electrical conducting material that filled into said straight hole to form said conducting plug.

Preferably the process of the present invention further comprises the step of preparing an upper lid covering the upper surface of said upper layer of said wafer, wherein said upper lid includes a plurality of through holes and insulating pads. said through holes correspond to said first conducting pad and said second conducting pad so that said first and second conducting pads are exposed to the outside and may connect with other electrical elements. Said insulating pads are used to form a gap between said upper lid and said upper layer of said wafer.

Preferably the process of the present invention further comprises the step of etching said lower layer of said wafer on its bottom surface to form a depression under said proof mass.

Preferably the process of the present invention further comprises the step of preparing a bottom lid that attaches to said bottom surface of said lower layer of said wafer.

Preferably said step to form said proof mass and said step to form said depression of said lower layer of said wafer can be performed simultaneously.

BRIEF DESCRIPTION OF THE DRAWINGS

A preferred process of the invention will be further described with reference to the accompanying figures by way of example only and without intending to be limiting, wherein.

DETAILED DESCRIPTION OF PREFERRED EMBODIMENTS

Figure 1:
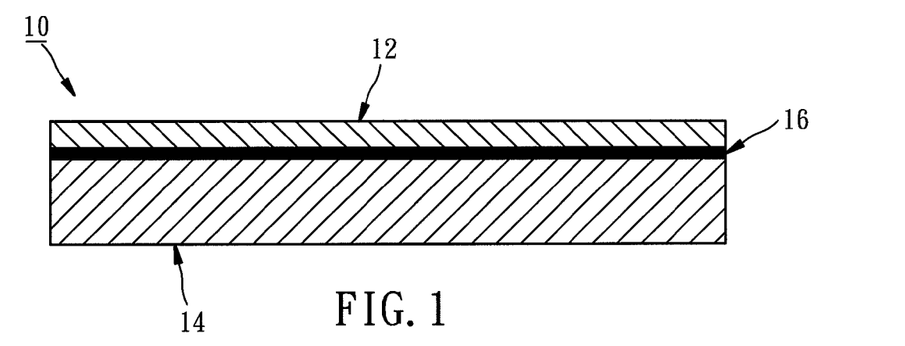
FIG. 1 is a cross-sectional view of a wafer of the present invention.

As shown in FIG. 1, the process according to the present invention firstly prepares a wafer 10. Wafer 10 includes an upper layer 12, a lower layer 14 and an intermediate layer 16. Upper layer 12 and lower layer 14 are made of semiconductor materials, such as Si, Ge or other materials with similar properties. Intermediate layer 16 is made of insulating materials, such as oxide, glass or other materials with similar properties. In this embodiment, the thickness of upper layer 12 is about 10 μm. The thickness of lower layer 14 is about 388 μm. The thickness of intermediate layer 16 is about 2 μm.

Figure 2:
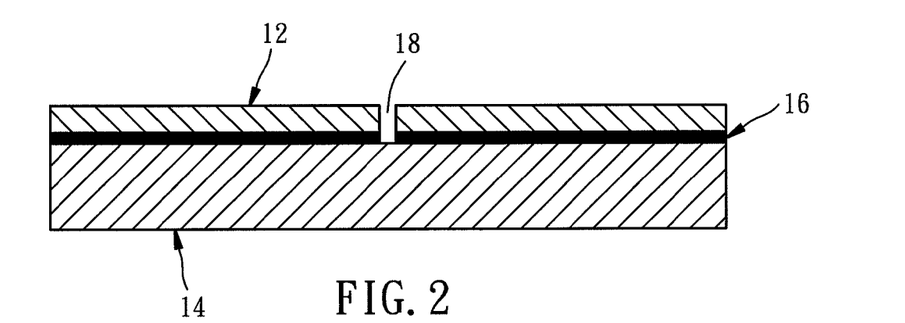
FIG. 2 shows the wafer as shown in FIG. 1 with a straight hole etched thereinto.

As shown in FIG. 2, four straight holes 18 are formed in the center portion of wafer 10. Each of holes 18 extends from upper layer 12 through intermediate layer 16 to lower layer 14. To form holes 18, lithography and etching processes as are well known to those skilled in the art and commonly used in the wafer fabrication industry may be used.

Figure 3:
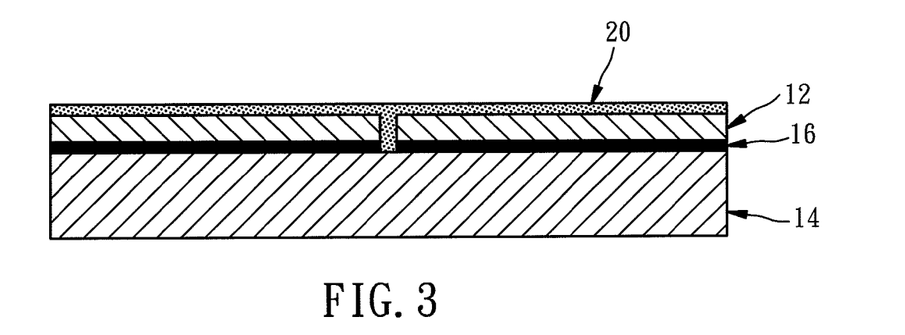
FIG. 3 shows the upper surface of the wafer with an electrical conducting material deposited thereon.
Figure 4:
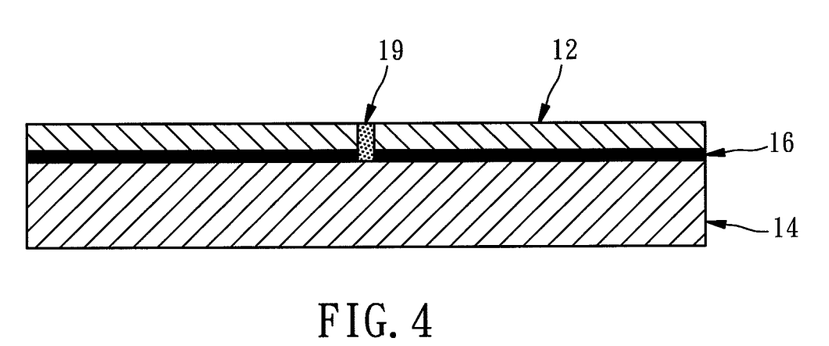
FIG. 4 shows said electrical conducting material removed from the upper surface of said upper layer except the portion that filled into said straight hole to form a conducting plug.

FIGS. 3 and 4 show that an electrical conducting material 20 is deposited upon the upper surface of upper layer 12 in such a way that each of straight holes 18 is filled by electrical conducting material 20. And then, electrical conducting material 20 is removed from the upper surface of upper layer 12 except the portion that filled into each of straight holes 18 so that a conducting plug 19 is formed therein.

Figure 5:
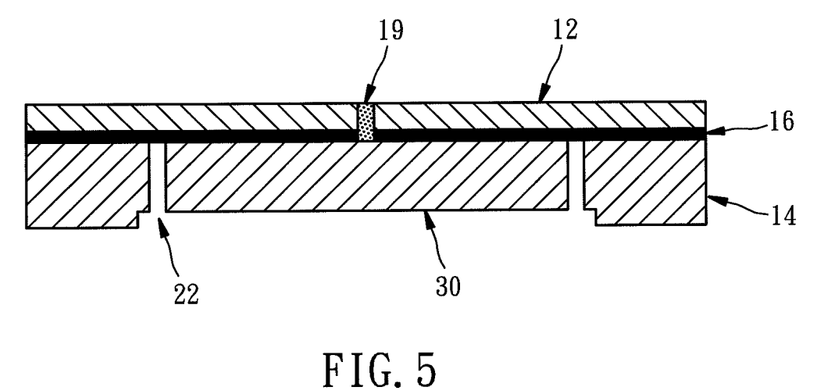
FIG. 5 shows that the lower and intermediate layers of the wafer are etched to form a depression and an isolated proof mass.
Figure 12:
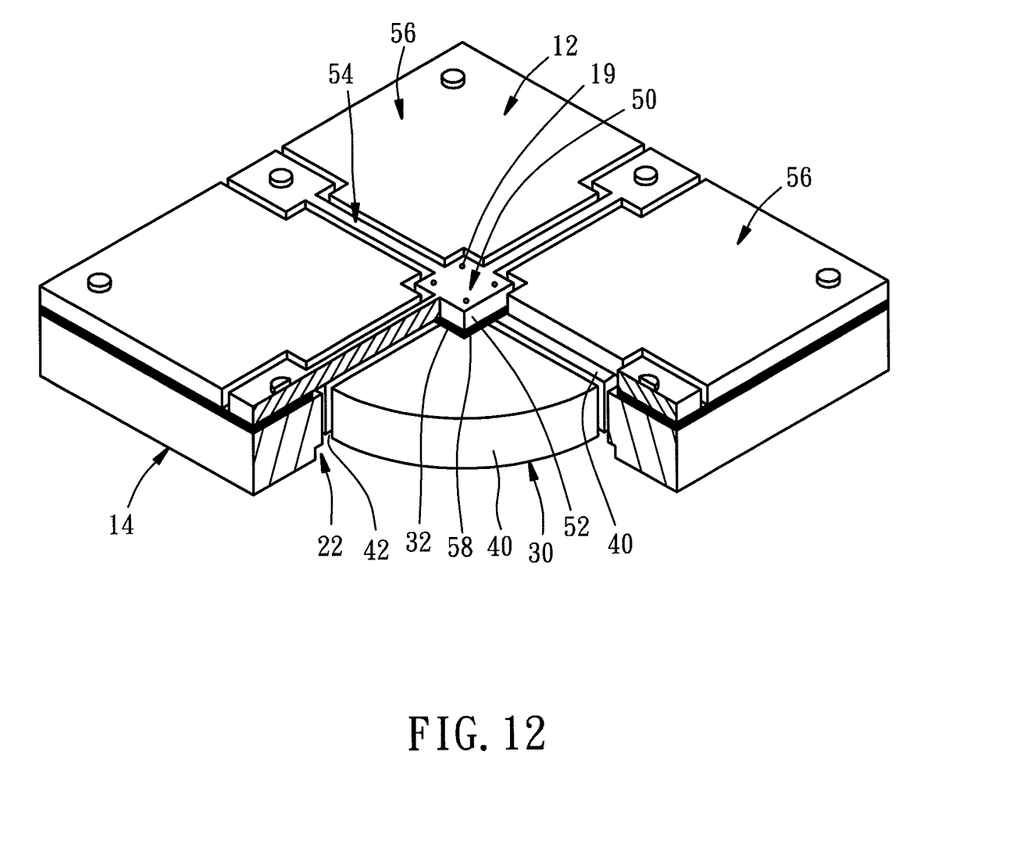
FIG. 12 is a partial cross-sectional perspective view of the wafer of the tri-axial accelerometer according to the present invention after the proof mass and the suspension are formed.

As shown in FIG. 5 and FIG. 12, lower layer 14 is etched to form a depression 22 and an isolated proof mass 30. In this embodiment, proof mass 30 has a core 32 and four segments 40 separated from each other by a slot 42. Each of segments 40 extends outward symmetrically from core 32.

Figure 6:
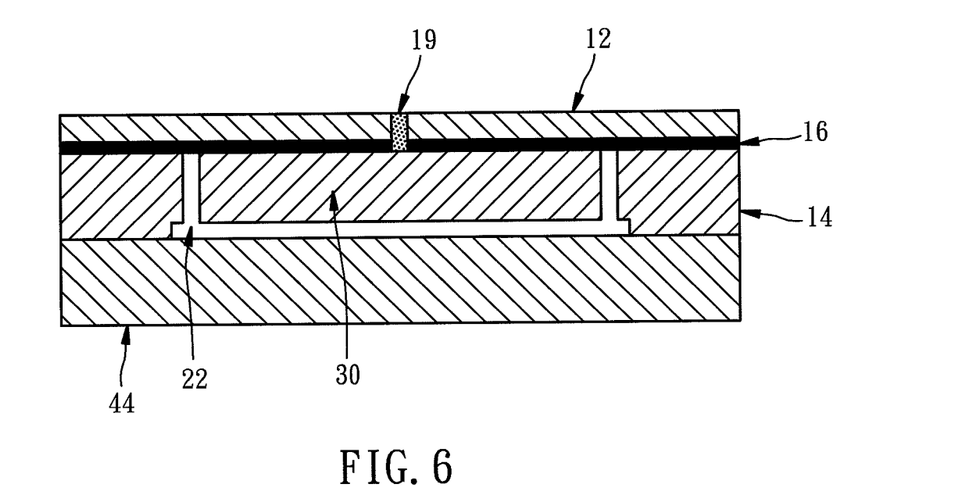
FIG. 6 shows the wafer with a bottom lid covering on the lower layer thereof.

FIG. 6 shows that a bottom lid 44 made of insulating materials, such as glass or other materials with similar properties, covers the bottom surface of lower layer 14. In this embodiment, when bottom lid 44 bonds to the bottom surface of lower layer 14, depression 22 and the upper surface of bottom lid 44 will define a gap wherein proof mass 30 can move without friction.

Figure 7:
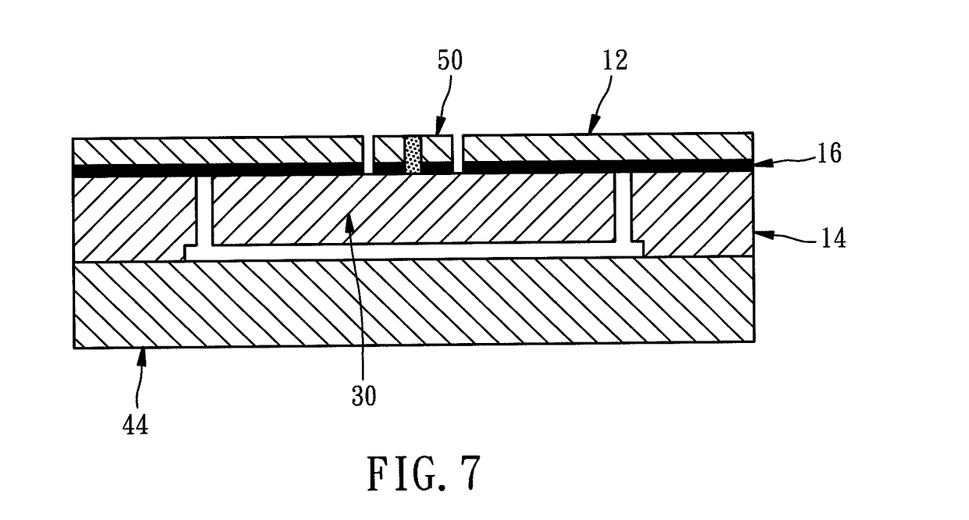
FIG. 7 shows a suspension is formed on the upper layer of the wafer thereof.
Figure 11:
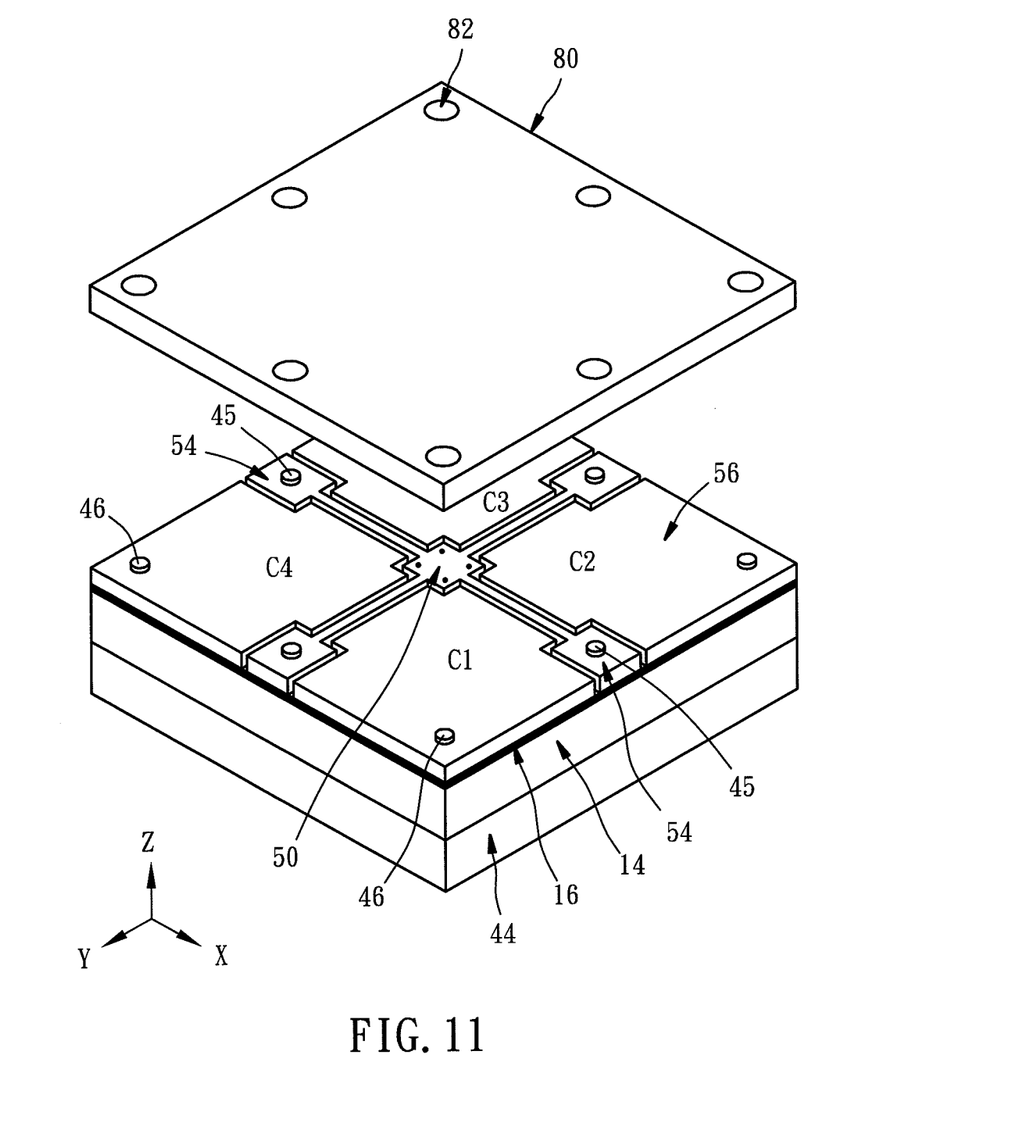
FIG. 11 is an exploded view of a tri-axial accelerometer according to the present invention.

FIG. 7 shows that upper layer 12 of wafer 10 is etched to form a suspension 50 and four separating plates 56. Referring to FIGS. 11 and 12 at the same time, suspension 50 has a center 52 and four arms 54 extending respectively symmetrically and outwardly from center 52. In this embodiment, the angle between any two adjacent arms 54 is ninety degrees. Center 52 connects with core 32 through a center portion 58 of intermediate layer 16. Center 52 and core 32 are electrically connected by conducting plug 19. Each of arms 54 has a width smaller than that of slot 42.

Figure 8:
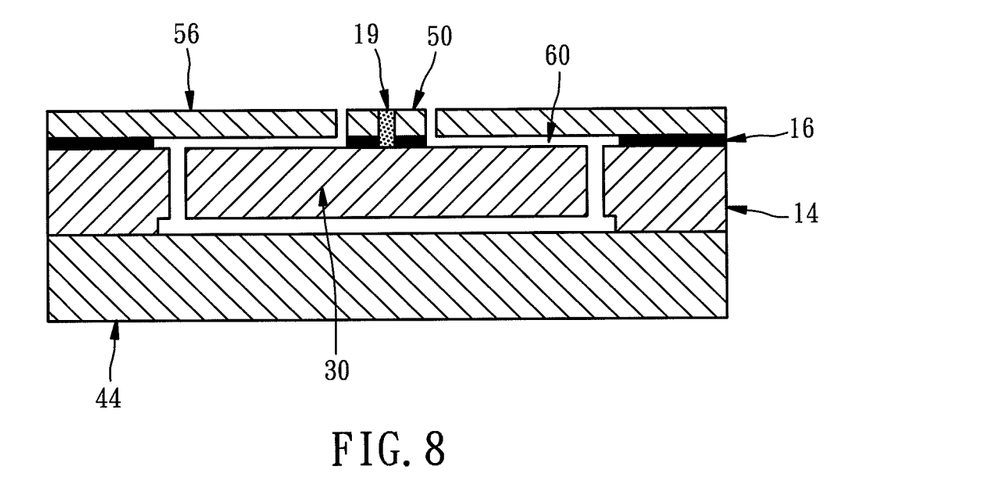
FIG. 8 shows that an annular portion of said intermediate layer is removed by an etching process.

FIG. 8 shows an annular portion of intermediate layer 16 surrounding the portion thereof under center 52 that is etched away to form a space 60 between each of separating plates 56 and each of four segments 40 so that proof mass 30 can swing up and down following suspension 50 in a limited range.

Figure 9:
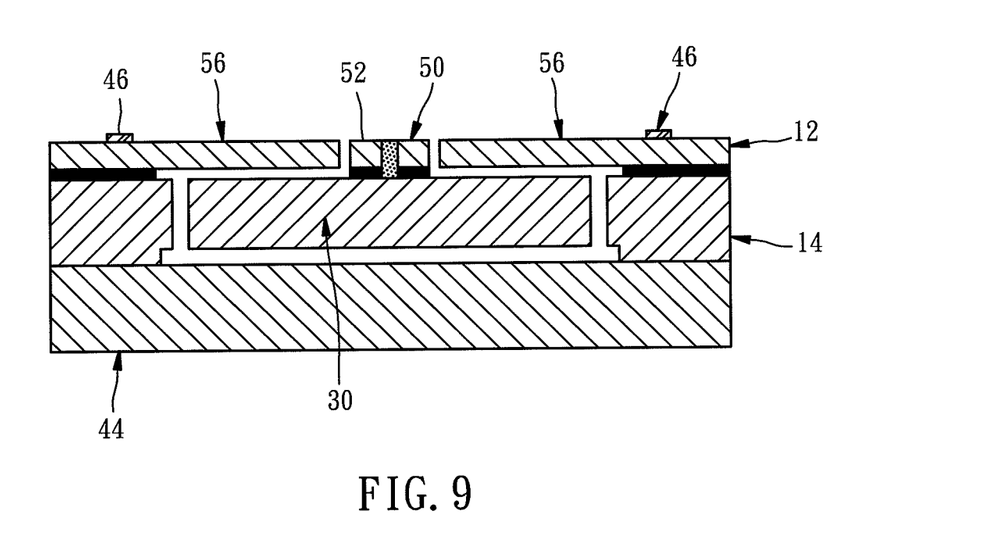
FIG. 9 shows that a plurality of conducting pads is deposited on the upper layer of the wafer.

FIG. 9 shows that an end of each of arms 54 of suspension 50 has a first conducting pad 45. An edge of each of separating plates 56 has a second conducting pad 46. In this embodiment, first and second conducting pads 45 and 46 are formed by a depositing process.

Figure 10:
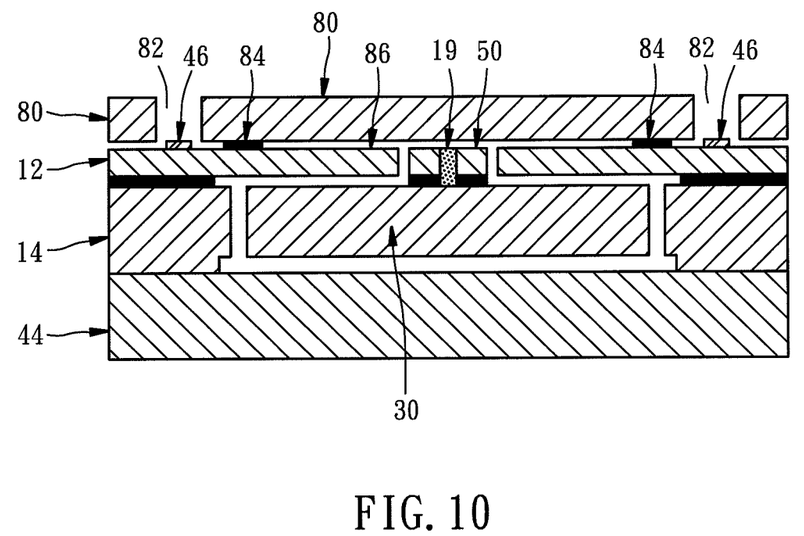
FIG. 10 shows that an upper lid covers the upper layer of the wafer.

FIG. 10 shows that an upper lid 80 covers the upper surface of upper layer 12 of wafer 10. Upper lid 80 includes a plurality of through holes 82 and insulating pads 84. Each of through holes 82 respectively corresponds to each of first conducting pad 45 and second conducting pad 46 so that first and second conducting pads 45 and 46 are exposed to the outside and may connect with other electrical elements. Pads 84 are used to form a gap 86 between upper lid 80 and upper layer 12 of wafer 10.

Figure 13:
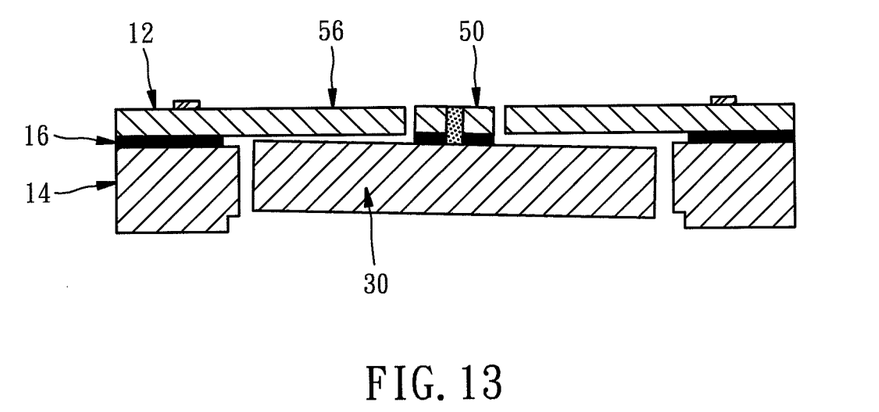
FIG. 13 is a cross-sectional view of the wafer of the tri-axial accelerometer according to the present invention after the proof mass and the suspension are formed, wherein the proof mass is tilted.

As shown in FIG. 12, segments 40 of proof mass 30 and plates 56 of upper layer 12 form four capacitance elements $C_1$, $C_2$, $C_3$, and $C_4$. For convenience of explanation, an XYZ three-dimensional coordinate system as shown in the lower left portion of FIG. 12 is defined. Two first capacitance sets corresponding to the X axis are $C_{x+}=C_1+C_2$, $C_{x-}=C_3+C_4$. Two second capacitance sets corresponding to the Y axis are $C_{y+}=C_1+C_4$, $C_{y-}=C_2+C_3$. A third capacitance set corresponding to the Z axis is $C_z=C_1+C_2+C_3+C_4$ As shown in FIG. 13, when acceleration occurs along X or Y axis, proof mass 30 will tilt towards one or another of plates 56 decreasing the capacitance on one side of the capacitance set $C_{x-}$ or $C_{y-}$ and increasing the capacitance on the other side of the capacitance set $C_{z+}$ or $C_{y+}$.

Figure 14:
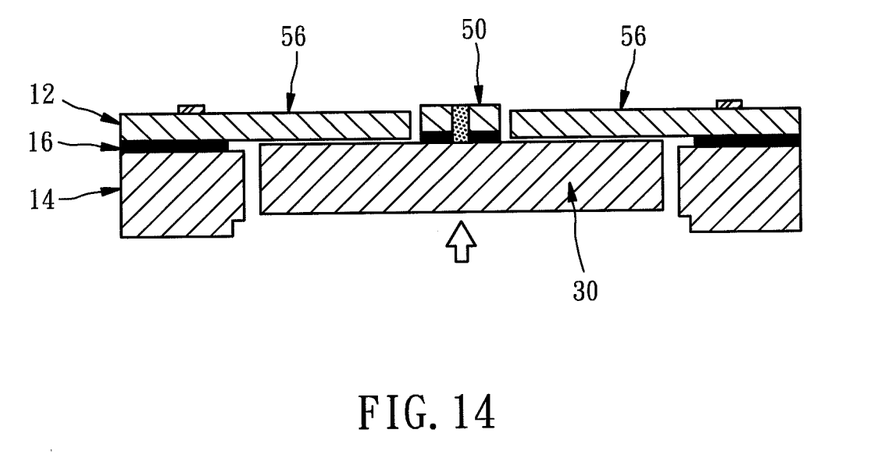
FIG. 14 is a cross-sectional view of the wafer of the tri-axial accelerometer according to the present invention after the proof mass and the suspension are formed, wherein the proof mass is moved upwardly.

As shown in FIG. 14, when acceleration occurs along Z axis, proof mass 30 will swing towards or away from all of plates 56 decreasing or increasing the capacitance of the capacitance set C.

As stated above, since the capacitance type tri-axial accelerometer made by the method according to the present invention has the capacitance sets formed integrally, the assess value of the accelerometer detected along one axis will not be affected by any other. Thus, it can precisely sense external accelerations. In addition, having a bigger mass to sense external accelerations allows the capacitance type tri-axial accelerometer to have a higher sensitivity than prior art. Furthermore, each of the accelerometers detecting acceleration occurring along X, Y and Z axes is located in the same place so that the size of the capacitance type tri-axial accelerometer as a whole can be effectively decreased.

What is claimed is:

1. A process for fabricating a capacitance type tri-axial accelerometer comprising:

preparing a wafer having an upper layer, an intermediate layer and a lower layer, said upper and lower layers being made of semiconductor material and said intermediate layer being made of insulating material;

etching said lower layer of said wafer to form an isolated proof mass having a core and four segments extending from said core;

etching said upper layer of said wafer to form a suspension and four separating plates, said suspension connecting with said core of said proof mass through said intermediate layer;

etching away a portion of said intermediate layer located between said four segments of said proof mass and said plates of said upper layer such that said proof mass can freely swing up and down following said suspension; and disposing an electrical conducting means to pass through said intermediate layer from said suspension to said core of said proof mass such that said suspension and said proof mass are electrically connected.

2. The process for fabricating a capacitance type tri-axial accelerometer according to claim 1, wherein each of said segments extends symmetrically and outwardly from said core.

3. The process for fabricating a capacitance type tri-axial accelerometer according to claim 2, wherein each of said segments is separated from each other by a slot disposed between said segments.

4. The process for fabricating a capacitance type tri-axial accelerometer according to claim 3, wherein said suspension has a center and four arms extending respectively, symmetrically and outwardly from said center.

5. The process for fabricating a capacitance type tri-axial accelerometer according to claim 4, wherein each of said arms of said suspension has a width smaller than that of said slot.

6. The process for fabricating a capacitance type tri-axial accelerometer according to claim 4, wherein said center of said suspension is connected with said core of said proof mass by a center portion of said intermediate layer located said upper and lower layers.

7. The process for fabricating a capacitance type tri-axial accelerometer according to claim 4, wherein each of said arms of said suspension has a first conducting pad disposed on an end thereof and each of said separating plates of said upper layer has a second conducting pad disposed on an edge thereof.

8. The process for fabricating a capacitance type tri-axial accelerometer according to claim 4, wherein said electrical conducting means is a conducting plug passing through said intermediate layer from said center of said suspension to said core of said proof mass.

9. The process for fabricating a capacitance type tri-axial accelerometer according to claim 8, wherein said conducting plug is formed by the steps of:

etching said upper layer and said intermediate layer to form a straight hole extending from said center of said suspension through said intermediate layer to said core of said proof mass;

depositing an electrical conducting material upon the upper surface of said upper layer in such a way that said straight hole is filled by said electrical conducting material; and removing said electrical conducting material from the upper surface of said upper layer except the portion that filled into said straight hole to form said conducting plug.

10. The process for fabricating a capacitance type tri-axial accelerometer according to claim 7, further comprising the step of preparing an upper lid that covers the upper surface of said upper layer of said wafer, wherein said upper lid includes a plurality of through holes and insulating pads.

11. The process for fabricating a capacitance type tri-axial accelerometer according to claim 1, further comprising the step of:

etching said lower layer of said wafer on its bottom surface to form a depression under said proof mass.

12. The process for fabricating a capacitance type tri-axial accelerometer according to claim 11, further comprising the step of:

preparing a bottom lid that attaches to said bottom surface of said lower layer of said wafer.

13. The process for fabricating a capacitance type tri-axial accelerometer according to claim 11, wherein said step to form said proof mass and said step to form said depression of said lower layer of said wafer can be performed simultaneously.

14. A capacitance type tri-axial accelerometer produced in accordance with the process for fabricating a capacitance type tri-axial accelerometer of claim 1.

* * * * *